US005532163A

United States Patent [19]

Yagi et al.

[11] Patent Number: 5,532,163

[45] Date of Patent: Jul. 2, 1996

[54] PROCESS FOR REFINING OIL AND FAT

[75] Inventors: Takashi Yagi; Masakazu Higurashi; Hiroka Tsuruoka, all of Chiba; Isao Nomura, Ibaraki, all of Japan

[73] Assignee: Showa Sangyo Co., Ltd., Tokyo, Japan

[21] Appl. No.: 231,842

[22] Filed: Apr. 25, 1994

[30] Foreign Application Priority Data

Apr. 25, 1993 [JP] Japan .................................... 5-132284
Mar. 31, 1994 [JP] Japan .................................... 6-097847

[51] Int. Cl.$^{6}$ ................................ C12S 3/18; C12S 3/00; C11B 3/02

[52] U.S. Cl. .......................... 435/271; 435/267; 435/262; 426/417; 426/425

[58] Field of Search .................................... 435/262, 267, 435/271; 426/417, 425

[56] References Cited

U.S. PATENT DOCUMENTS 4,555,483 11/1985 LiMuti et al. ............................ 435/19
5,264,367 11/1993 Aalrust et al. .......................... 435/271

FOREIGN PATENT DOCUMENTS 0070269 1/1983 European Pat. Off. .......... C11B 3/00
0513709 11/1992 European Pat. Off. .......... C11B 3/00
53-38281 10/1978 Japan ................................ C11C 1/08
2153997 6/1990 Japan ................................ C11B 3/02

OTHER PUBLICATIONS

Takahashi et al. "A Method of Purifying Oil and Fat". (Translation of Document L) D2–153997 Published unexamined patent application, Jun. 13, 1990.

*Primary Examiner*—Donald E. Czaja
*Assistant Examiner*—Timothy J. Reardon
*Attorney, Agent, or Firm*—Sughrue, Mion, Zinn, Macpeak & Seas

[57] ABSTRACT

This invention provides processes for the refining of oil and fat by which phospholipids in the oil and fat to be treated can be decomposed and removed efficiently. Particularly, it provides a process for the refining of oil and fat which comprises reacting, in an emulsion, the oil and fat with an enzyme having an activity to decompose glycerol-fatty acid ester bonds in glycerophospholipids (e.g., pancreas-derived phospholipase $A_2$); and another process in which the enzyme-treated oil and fat is washed with water or an acidic aqueous solution. Preferably, the acidic aqueous solution to be used in the washing step is a solution of at least one acid selected from the group consisting of citric acid, acetic acid, phosphoric acid and salts thereof. Also, it is preferred that the emulsified condition is formed using 30 weight parts or more of water per 100 weight parts of the oil and fat. Since oil and fat can be purified without employing the conventional alkali refining step, generation of washing waste water and industrial waste can be reduced. In addition, the recovery yield of oil is improved because loss of neutral oil and fat due to their inclusion in these wastes does not occur in the inventive process.

7 Claims, No Drawings

PROCESS FOR REFINING OIL AND FAT

FIELD OF THE INVENTION

This invention relates to a process for the refining of oil and fat. More particularly, it relates to a process for the refining of oil and fat, in which an enzyme is allowed to react with the oil and fat in an emulsified condition, thereby effecting efficient decomposition and, thus, removal of phospholipids from the oil and fat to be treated.

BACKGROUND OF THE INVENTION

Oils obtained from the usual oil and fat production processes by compressing oil-bearing materials or by extracting oil from the materials and removing the extraction solvent (hereinafter, referred to as "crude oil") contain impurities such as polar lipids mainly composed of phospholipids, as well as fatty acids, pigments, odor components and the like. Thus, it is necessary to remove these impurities by a refining process. The refining process requires a degumming step and an alkali refining step. In the degumming step, hydration of phospholipids and the like is effected by adding hot water to the crude oil and gum materials are removed by centrifugation. In the alkali refining step free fatty acids in the degummed oil are neutralized with caustic soda and removed by centrifugation.

Thereafter, refining of oil and fat is completed via a bleaching step in which chlorophyll and the like pigments are removed by allowing them to be adsorbed by activated clay, activated carbon or the like and a deodorization step in which odor components are removed by vacuum distillation. In the case of the production of salad oil, a dewaxing step is optionally employed in order to crystallize and remove solid fats, waxes and the like which are apt to be solidified.

However, in the alkali refining step in which free fatty acids are neutralized with caustic soda and then removed by centrifugation, residual phospholipids are also removed, but the step generates so-called "soap stocks" which contain a large quantity of accompanying oil. Though a portion of the soap stocks is used as production material for fatty acids, they are treated mostly as industrial waste.

In addition, in the subsequent neutralization step, the processed oil is washed with hot water in order to remove soap dissolved in the oil, thus generating a large quantity of oil-containing alkaline waste water which must also be treated.

These alkali refining and neutralization steps cause a great loss in the oil and fat yield.

Thus, since the conventional oil and fat refining process requires complex and time-consuming steps, great concern has been directed toward the development of a refining process which can be operated more efficiently by simplification and the like.

With regard to the omission of the alkali refining step which generates waste materials and reduces oil yield, a so-called steam refining process in which free fatty acids are removed by vacuum steam distillation in the deodorization step (JP-B-53-38281 for instance), a process in which degummed oil is treated with an enzyme having phospholipase A activity (JP-A-2-153997), a process in which a phosphatase is used (EP-A 0,070,269) and a process in which phospholipases $A_1$, $A_2$ and B are used (EP-A 0,513, 709) have been proposed. (The term "JP-A" as used herein means an "unexamined published Japanese patent application", and the term "JP-B" means an "examined Japanese patent publication".)

However, the process of JP-B-53-38281 is limited to the refining of low phospholipid oil and fat derived from palm oil and the like materials, and it entails production of oil and fat containing a large quantity of remaining phospholipids when applied to a starting material derived from generally used oil seed such as soybean, rapeseed or the like. Such a product cannot be used commercially because of considerable coloring and odor generated by heating.

On the other hand, the processes of JP-A-2-153997, EP-A-0,513,709 and EP-A-0,070,269 require either a prolonged period of time for reaction with the oil or a large amount of enzyme.

SUMMARY OF THE INVENTION

An object of the present invention is to provide a process for the refining of oil and fat by which phospholipids in the oils and fats to be treated can be decomposed and removed efficiently.

The inventors of the present invention have conducted intensive studies with the aim of developing an efficient oil and fat refining process composed of simplified steps, namely an oil and fat refining process which is not only free from the aforementioned problems involved in the prior art but also economically advantageous in terms of reduction of enzyme cost, savings in washing water and the like and satisfactory in view of the quality of the oil and fat produced. As a result, the present invention in which phospholipids in oils and fats to be treated are decomposed and removed efficiently has been accomplished.

The present invention relates to a process for the refining of oil and fat which comprises reacting, in an emulsified condition, the oil and fat with an enzyme having activity to decompose glycerol-fatty acid ester bonds in glycerophospholipids.

Other objects and advantages of the present invention will be made apparent as the description progresses.

DETAILED DESCRIPTION OF THE INVENTION

The oils and fats to be treated by the process of the present invention are unpurified oils such as crude oils or degummed oils containing phospholipids in an approximate amount of from 100 to 10,000 ppm. Sources of oil and fat are not particularly limited, provided that they are plant oils and fats suitable for use in food, such as of soybean, rapeseed, sunflower, cotton seed, safflower, peanut and the like.

The enzyme to be used in the process of the present invention should have activity to decompose glycerol-fatty acid ester bonds in glycerophospholipids. Illustrative examples of such enzymes include phospholipase $A_1$ which hydrolyzes fatty acid ester bonds at the $\alpha$ position of glycerol residues of a glycerophospholipid, phospholipase $A_2$ which hydrolyzes fatty acid ester bonds at the $\beta$ position and phospholipase B (also called lysophospholipase) which hydrolyzes lysoglycerophospholipids.

These enzymes having high activity exist in snake venom and animal organs such as the pancreas and are also produced by microorganisms belonging to the genus Serratia, Penicillium or the like.

Suitable enzymes are available commercially. As typical examples of the enzymes for practical use, pancreas-derived phospholipase $A_2$ such as Lecitase (manufactured by Novo) is preferably used.

According to the present invention, these enzymes are dispersed or dissolved in water or an appropriate buffer or aqueous solution and added to the oil and fat containing about 100 to 10,000 ppm of phospholipids. The time of adding the enzyme solution to the oil and fat is not restricted, but it is preferred to add the enzyme solution to the crude oil or degummed oil.

In order to improve contact efficiency between the oil and water phases, the enzyme reaction is preferably carried out in an emulsified condition using a suitable emulsifier such as a high speed mixer, a homomixer, a colloid mill, a pipeline mixer, an ultrasonic dispersion apparatus, a high pressure homogenizer, a vibrator, a membrane emulsifying apparatus or the like.

The term "emulsified condition" as used herein means a condition in which oil is dispersed in an aqueous dispersion medium, in the form of fine particles having an average particle size of from 0.1 to 50 μm, preferably from 1 to 10 μm.

In the usual oil and fat refining process, water is not used in a large volume, because it causes increased waste water volume. However, the present inventors have studied on the effect of enzyme reaction in an emulsified condition and have found advantages that increased water volume is effective in: (1) enhancing the enzyme reaction and transfer of the enzyme hydrolyzation products into the water phase by increase of the contact surface between the oil and water, (2) reducing the load of the emulsifier because there is no generation of gum which is found in the conventional method that requires degumming and alkali refining steps and because there is no increase in viscosity which is found typically in W/O emulsion systems, and (3) separating oil and water easily and thereby allowing repeated use of the separated enzyme solution as it is. As a consequence, not only is there a savings in the amount of enzyme used, but also it is possible to reduce the amount of water to a lower level than that of the prior art process by circulated use of water.

The amount of enzyme to be used in the treatment may be in the range of preferably from 10 to 20,000 units, more preferably from 100 to 2,000 units, per 1 kg of oil and fat. Depending on the type of enzyme used, a factor essential for expression of its activity or a factor which increases the activity, such as calcium or the like, may be added to the reaction system. The pH of the enzyme reaction may be adjusted depending on the type of enzyme used although the optimum pH in this process does not always match with the optimum pH in enzymology. For example, although the swine pancreas-derived phospholipase $A_2$ (Lecitase) used in Example 1 has an optimum pH of 8 to 9, it is practical to carry out the enzyme reaction at a slightly acidic pH of 5.5 to 6.5, because the reaction system is strongly emulsified when the reaction pH exceeds 8. In addition, since water after its contact with conventional crude oil has a pH value of 5.5 to 6.5, it is not necessary to adjust the pH of the enzyme solution, thus rendering possible sharp reduction on the burden of a waste water treatment system. Also, salts such as sodium chloride and the like may be added in an amount of about 5% or less based on the washing water, in order to enhance separation of the oil and water phases after the reaction.

The enzyme treatment may be carried out at a temperature of generally from 30° to 90° C., preferably from 55° C. to 75° C., for a period of approximately from 5 minutes to 10 hours, although such conditions vary depending on the optimum temperature of the enzyme used.

The amount of water for use in the dissolution of the enzyme may be 30 weight parts or more, preferably 50 weight parts or more, per 100 weight parts of oil and fat. However, since the amount of water exceeding 200 weight parts hardly enhance the enzyme reaction and the transferring of the phospholipids from oil and fat, it is more preferred from the viewpoints of economical point and stable operation that the amount of water to be used is within a range of 50 to 200 weight parts per 100 weight parts of oil and fat.

One unit of activity of each enzyme is defined as the amount of the enzyme forming 1 micromol of fatty acids within 1 minute in the following reaction system.

| | |
|---|---|
| Enzyme and Substrate: | |
| phospholipases $A_1$ and $A_2$; | |
| phosphatidylcholine (soybean origin) | |
| phospholipase B; | |
| lysophosphatidylcholine (soybean origin) | |
| Substrate concentration: | 2 mg/ml |
| Calcium concentration: | 6 mM |
| Reaction time: | 5 minutes |
| Reaction temperature: | 40° C. |
| Reaction pH: | optimum pH of each enzyme |

After the enzyme treatment, the enzyme solution is separated by an appropriate means such as centrifugation or the like, thereby obtaining treated oil. In this step, most of the phosphorus-containing compounds such as lysophosphatidylcholine, lysophosphatidylethanolamine, glycerophosphorylcholine, glycerophosphorylethanolamine and the like formed by the enzymatic hydrolysis of the gum content are transferred into the water phase and removed from the oil phase.

Further, phospholipids can be removed more efficiently by optionally employing after the enzyme treatment an additional step in which the treated oil is washed with (hot) water or a (hot) dilute acid solution, that is, a refining process which comprises reacting, in an emulsified condition, the oil and fat with an enzyme having an activity to decompose glycerol-fatty acid ester bonds in glycerophospholipids and subsequently washing the treated oil and fat with a washing water.

The amount of the washing water for use in the washing treatment may be 30 weight parts or more, preferably from 30 to 200 weight parts, per 100 weight parts of the treated oil and fat. Also, the washing treatment may be carried out at a temperature of 55° C. or more, preferably from 55° to 80° C. It is preferred that the washing is carried out preferably under an emulsified condition using an emulsifier similar to the one used in the enzyme treatment.

Although the washing can be effected with water, removal of phospholipids can be effectively made by the use of an acidic aqueous solution, preferably an acidic aqueous solution having a pH value of 3 to 6. Illustrative examples of such acidic aqueous solution include an organic acid such as acetic acid or citric acid or a salt thereof and phosphoric acid or a salt thereof. More effective removal of phospholipids can be made by the use of a solution containing 1 to 100 mM of an organic or inorganic acid such as acetic acid, phosphoric acid, citric acid or the like and having a pH value of 3 to 6. Salts of the organic or inorganic acid also can be used. Also, in order to enhance separation of oil and water systems after the reaction, salts such as sodium chloride and the like may be added to the washing solution in an amount of about 5% or less. These enzyme reaction and washing steps can be carried out in a multi-step or continuous fashion.

Phospholipid components remaining in the oil processed by the above operations are extremely small, and can be further reduced to such a level that they do not spoil the quality of the final product, by their removal with an adsorbent such as activated clay, activated carbon or the like through the subsequent bleaching step which is carried out in the usual way.

In addition, an alkali refining step is not necessary in the process of the present invention, because free fatty acids remaining in the processed oil are completely removed by vacuum steam distillation in the deodorization step.

The following inventive and comparative examples are provided to further illustrate the present invention. It is to be understood, however, that the examples are for the purpose of illustration only and are not intended as a definition of the limits of the present invention. In the following Examples and Comparative Example, phospholipid analysis was carried out in accordance with the procedure of Japanese Standard Oil and Fat Analysis 2.2.8.1-71.

EXAMPLE 1

A 1.5 kg portion of unpurified soybean oil (phospholipids, 2,900 ppm) was mixed with 1.5 liters of an enzyme solution (Lecitase, manufactured by Novo; 200 units per liter of solution containing 5 mM calcium chloride and 10 mM citric acid, pH 6), and the mixture was subjected to 2 hours of reaction at 60° C. with stirring at 10,000 rpm using TK homomixer (MARK-II 2.5 type, manufactured by Tokushu Kika Kogyo). After completion of the reaction, the enzyme solution was removed by 5 minutes of centrifugation at 1,500 G, thereby obtaining an enzyme-treated oil containing 310 ppm of phospholipids. Next, the thus treated oil was washed for 10 minutes with 1.5 liters of 100 mM citric acid solution (pH 4) under the same stirring condition employed at the time of the enzyme treatment. After centrifugation and subsequent vacuum dewatering of the resulting oil, the thus dewatered oil was mixed with 1.0 wt % activated clay (NV, manufactured by Mizusawa Kagaku Kogyo) and subjected to 20 minutes of bleaching at 105° C. under 30 mmHg to obtain a bleached oil containing 27 ppm of phospholipids.

COMPARATIVE EXAMPLE 1

The process of Example 1 was repeated except that the oil was treated with 45 ml of an enzyme solution (670,000 units per liter of solution containing 5 mM calcium chloride and 100 mM citric acid, pH 5) and the washing treatment was not carried out, thereby obtaining a bleached oil having a phospholipid content of 950 ppm.

In comparing Example 1 with Comparative Example 1, the phospholipid content after the enzyme reaction in an emulsion was 310 ppm in Example 1, which was 3 times lower than that (950 ppm) after the bleaching in Comparative Example 1 (corresponding to EP-A-0,513,709), and the content after the bleaching was only 27 ppm in Example 1 which was about 35 times superior to the case of Comparative Example 1.

EXAMPLE 2

A 1.5 kg portion of unpurified soybean oil (phospholipids, 2,500 ppm) was mixed with 1.5 liters of an enzyme solution (Lecitase, manufactured by Novo; 20,000 units per liter of solution containing 5 mM calcium chloride), and the mixture was subjected to 2 hours of reaction at 60° C. with stirring at 10,000 rpm using a TK homomixer (MARK-II 2.5 type, manufactured by Tokushu Kika Kogyo). After completion of the reaction, the oil phase recovered by centrifugation was subjected to the bleaching in the same manner as in Example 1. Thereafter, the phospholipid content in the thus bleached oil of this example, and all remaining examples and comparative examples was measured in the same way as in Example 1.

EXAMPLE 3

A bleached oil was obtained by repeating the process of Example 2 except that concentration of the enzyme was changed to 2,000 units/liter (Lecitase, manufactured by Novo; a solution containing 5 mM calcium chloride).

EXAMPLE 4

Enzyme treatment was carried out in the same manner as described in Example 2 except that concentration of the enzyme was changed to 200 units/liter (Lecitase, manufactured by Novo; a solution containing 5 mM calcium chloride), the enzyme solution was removed by centrifugation and then the resulting oil was washed with 1.5 liters of water for 10 minutes under the same temperature and stirring conditions as used in the enzyme treatment. After centrifugation, the resulting oil was subjected to bleaching under the same conditions as described in Example 1, thereby obtaining a bleached oil.

EXAMPLE 5

A bleached oil was obtained by repeating the process of Example 4 except that a 10 mM citric acid solution (pH adjusted to 4.0 with sodium hydroxide) was used as the washing solution instead of water.

EXAMPLE 6

A bleached oil was obtained by repeating the process of Example 4 except that a 10 mM phosphoric acid solution (pH adjusted to 4.0 with sodium hydroxide) was used as the washing solution instead of water.

EXAMPLE 7

A bleached oil was obtained by repeating the process of Example 4 except that a 10 mM acetic acid solution (pH adjusted to 4.0 with sodium hydroxide) was used as the washing solution instead of water.

COMPARATIVE EXAMPLE 2

A bleached oil was obtained by repeating the same enzyme treatment and bleaching as described in Example 2 except that a mixer (250 rpm) equipped with a propeller agitation blade of 60 mm in diameter was used.

COMPARATIVE EXAMPLE 3

A bleached oil was obtained by repeating the process of Example 7 except that the enzyme was not added.

The phospholipid contents in these bleached oils obtained above are shown in Table 1.

TABLE 1

| | Mixer | Enzyme (U/l) | Washing Solution | Remaining Phospholipids (ppm) |
|---|---|---|---|---|
| Example 2 | TK homo | 20,000 | — | 50 |
| Example 3 | TK homo | 2,000 | — | 145 |
| Example 4 | TK homo | 200 | water | 44 |
| Example 5 | TK homo | 200 | phosphoric acid | 26 |
| Example 6 | TK homo | 200 | citric acid | 18 |
| Example 7 | TK homo | 200 | acetic acid | 21 |
| Comparative Example 2 | propeller | 20,000 | — | 870 |
| Comparative Example 3 | TK homo | 0 | acetic acid | 1,540 |

(Notes)
Mixer TK homo: TK Homomixer MARK-II 2.5 Type
Propeller: a propeller type agitation blade As is evident from the comparative results shown in Example 2 and Comparative Example 2 (corresponding to JP-A-2-153997), the use of an appropriate mixing emulsifier rendered possible improvement of enzyme reaction efficiency and drastic reduction of phospholipids remaining in bleached oils. In addition, the quantity of enzyme used was economized by the introduction of a washing step, and it was surprised that the quantity of enzyme could be economized by 1/100. The effect of the present invention was further improved by the addition of an inorganic or organic acid such as phosphoric acid, citric acid, acetic acid or the like to the washing solution. Since enzyme cost is a significant factor in enzyme-aided phospholipid removal processes, these effects of the present invention are highly valuable.

EXAMPLE 8

A 2 kg portion of unpurified soybean oil (phospholipids, 2,200 ppm) was mixed with 1 liter of an enzyme solution (Lecitase, manufactured by Novo; 400 units per liter of 5 mM calcium chloride solution containing 2% sodium chloride), and the mixture was subjected to 2 hours of reaction at 70° C. with stirring at 10,000 rpm using CleaMix (CLM-L 2.5S, manufactured by M Technique). After completion of the reaction, the oil phase was recovered by 5 minutes of centrifugation at 1,500 G and washed with 2 liters of 10 mM citric acid solution (pH 4) containing 1% sodium chloride. The washing was carried out for 10 minutes under the same stirring and temperature conditions as used in the enzyme reaction. Thereafter, bleaching was carried out in the same manner as described in Example 1, and the resulting oil was used as a first treated oil.

Using the spent enzyme solution and washing solution recovered in the above process, 2 kg of another unpurified soybean oil (phospholipids, 1,800 ppm) was purified in the same manner to be used as a second treated oil.

Phospholipids contained in the first and second treated oils were 21 ppm and 28 ppm, respectively. Thus, the enzyme solution and washing water could be repeatedly used.

EXAMPLE 9

A 50 kg portion of unpurified rapeseed oil (phospholipids, 5,400 ppm) was mixed with 50 liters of an enzyme solution (Lecitase, manufactured by Novo; 1,000 units per liter of 5 mM calcium chloride solution containing 2% sodium chloride), and the mixture was subjected to 2.5 hours of reaction at 65° C. with stirring at 3,600 rpm using a TK Homomixer (MARK-II 160, manufactured by Tokushu Kika Kogyo). After completion of the reaction, the oil phase was recovered on standing and washed with 50 liters of 10 mM acetic acid solution (pH 4). The washing was carried out for 10 minutes under the same stirring and temperature conditions as used in the enzyme reaction. A 1 kg portion of the resulting oil separated on standing was dewatered by centrifugation. Thereafter, bleaching was carried out in the same manner as described in Example 1 except that the amount of activated clay was changed to 2.5%, and the resulting oil was further subjected to deodorization at 255° C. under 8 mmHg with a steam blowing ratio of 1.5 g/kg oil. The product oil contained 38 ppm of phospholipids and was excellent in quality in terms of taste when cooled, odor when heated, coloring when heated and the like.

EXAMPLE 10

A 1.5 kg portion of unpurified safflower oil (phospholipids, 5,000 ppm) was mixed with 3 kg of an enzyme solution (50 units/liter of bee toxin phospholipase $A_2$, manufactured by Boehringer-Mannheim), and the mixture was circulated for 30 minutes through a Harmonizer (manufactured by Nanomizer) at 40° C. under a pressure of 9 $kg/cm^2$. After centrifugation, to the resulting oil was added 2 liters of 5 mM acetic acid (pH 5), and the mixture was circulated at 80° C. for 10 minutes through a Harmonizer. The oil obtained by centrifugation was subjected to bleaching in the same manner as described in Example 1 to obtain a bleached oil containing 20 ppm of phospholipids.

Thus, as has been described in the foregoing, according to the process of the present invention, oil and fat can be purified without employing the conventional alkali refining step which causes a serious problem of generating waste water and industrial waste containing a large quantity of oil. Because of this, generation of industrial wastes such as soap stocks and washing waste water specific for alkali refining, as well as loss of neutral oil and fat due to their inclusion in these wastes, can be reduced in the process of the present invention, thus resulting in yield improvement and reduction of oil and fat refining costs as a whole.

While the invention has been described in detail and with reference to specific examples thereof, it will be apparent to one skilled in the art that various changes and modifications can be made therein without departing from the spirit and scope thereof.

What is claimed is:

1. A process for removing phospholipids in refining of oil and fat containing about 100 to 10,000 ppm of phospholipids which comprises:

reacting, in an emulsified condition, said oil and fat with an enzyme having activity to decompose glycerol-fatty acid ester bonds in phospholipids present in said oil and fat, to achieve treated oil and fat having lower amounts of said phospholipids, wherein said emulsified condition is a condition in which oil and fat is dispersed in an aqueous dispersion medium, in the form of fine particles having an average particle size of from about 0.1 to 50 μm and is formed using 30 weight parts or more of water per 100 weight parts of said oil and fat;

and separating, the treated oil and fat from the decomposed phospholipids present in the emulsified condition.

2. A process for removing phospholipids in refining oil and fat containing about 100 to 10,000 ppm of phospholipids which comprises:

reacting, in an emulsified condition, said oil and fat with an enzyme having activity to decompose glycerol-fatty acid ester bonds in phospholipids present in said oil and fat to achieve lower amounts of said phospholipids in said oil and fat;

wherein said emulsified condition is a condition in which oil and fat is dispersed in an aqueous dispersion medium, in the form of fine particles having an average particle size of from about 0.1 to 50 μm and is formed using 30 weight parts or more of water per 100 weight parts of said oil and fat; and separating, the treated oil and fat from the decomposed phospholipids present in the emulsified condition, and subsequently washing the treated oil and fat with washing water to remove residual phospholipids, wherein said washing is carried out using 30 weight parts or more of said washing water per 100 weight parts of said oil and fat.

3. The process for removing phospholipids in refining of oil and fat according to claim 1 or 2, wherein said enzyme is pancreas-derived phospholipase $A_2$.

4. The process for removing phospholipids in refining of oil and fat according to claim 2, wherein said washing is carried out using from 30 to 200 weight parts of said washing water per 100 weight parts of said treated oil and fat.

5. The process for removing phospholipids in refining of oil and fat according to claim 2, wherein said washing water is water or an acidic aqueous solution.

6. The process for removing phospholipids in refining of oil and fat according to claim 5, wherein said acidic aqueous solution has a pH value of from 3 to 6.

7. The process for removing phospholipids in refining of oil and fat according to claim 6, wherein said acidic aqueous solution is an acidic aqueous solution of at least one acid selected from the group consisting of citric acid, acetic acid, phosphoric acid and salts thereof.

* * * * *